United States Patent [19]

Egeröd et al.

[11] Patent Number: 4,575,758
[45] Date of Patent: Mar. 11, 1986

[54] METHOD OF DISPLAYING ON A VIEWING SCREEN THE OUTPUT SIGNALS FROM A DETECTOR SENSITIVE TO RADIATION

[75] Inventors: Eskel Egeröd, Mölndal; Lars Y. A. Yngvesson, Växjö, both of Sweden

[73] Assignee: Telefonaktiebolaget LM Ericsson, Stockholm, Sweden

[21] Appl. No.: 448,905
[22] PCT Filed: Apr. 23, 1982
[86] PCT No.: PCT/SE82/00132
   § 371 Date: Dec. 6, 1982
   § 102(e) Date: Dec. 6, 1982
[87] PCT Pub. No.: WO82/03959
   PCT Pub. Date: Nov. 11, 1982

[30] Foreign Application Priority Data

May 5, 1981 [SE] Sweden ................................. 8102799

[51] Int. Cl.$^4$ .............................................. H04N 5/14
[52] U.S. Cl. ..................................... 358/166; 358/169
[58] Field of Search ............... 358/160, 166, 167, 169, 358/113, 174

[56] References Cited

U.S. PATENT DOCUMENTS

| | | | |
|---|---|---|---|
| 3,975,586 | 8/1976 | Chow et al. | 358/166 |
| 4,030,125 | 6/1977 | Bedell et al. | 358/169 |
| 4,220,972 | 9/1980 | Geokezas et al. | 358/166 |
| 4,262,304 | 4/1981 | Faroudja | 358/166 |
| 4,263,616 | 4/1981 | Lee | 358/166 |
| 4,414,564 | 11/1983 | Hitchcock | 358/166 |

Primary Examiner—Edward L. Coles, Sr.
Attorney, Agent, or Firm—Roberts, Spiecens & Cohen

[57] ABSTRACT

In displaying on a viewing screen an image generated by output signals from a radiation-sensitive detector, e.g., an infrared detector, it may occur that weakly contrasting details in the image are lost when the light intensity of the image covers too great an intensity range. In one method of avoiding this loss of details, the amplification of the low-frequency portions of the video signals is regulated adaptively by calculating two statistical parameters, characteristic for the statistical properties of the signal values, and adjusting the amplification such that a selected image intensity corresponds to the calculated parameters.

6 Claims, 5 Drawing Figures

METHOD OF DISPLAYING ON A VIEWING SCREEN THE OUTPUT SIGNALS FROM A DETECTOR SENSITIVE TO RADIATION

FIELD OF THE INVENTION

The present invention relates to a method for displaying on a viewing screen the output signals from a detector sensitive to radiation.

BACKGROUND

Many methods exist for displaying on a viewing screen an image which has been picked up on a radiation-sensitive detector, e.g., an infrared (IR) detector. The screen is usually of the kind on which is produced an image housing adjacent lines or a raster similar to that used for displaying television pictures.

A video system is known, e.g., from U.S. Pat. No. 3,975,586, in which the output signal from a radiation-sensitive detector is converted to a video signal used for producing an image of the scene in front of the radiation detector. In order to present the loss of small details in the image, which are reproduced by high-frequency components in the video signal, in highlighted portions of the image, which are reproduced by low-frequency components in the video signal with high amplitude, it is proposed according to the above patent that the image contrast shall be improved such that the amplitude of the low-frequency components is limited, while the high-frequency components are left unchanged.

A drawback with the proposed amplitude limitation is that the difference in image intensity which would have been interesting to display cannot be displayed if the intensity falls outside the limitation. For example, if an image contains both sky and ground, and both have high intensity, no difference between these will be visible in the image, and thus the horizon can be invisible, which is detrimental in some cases.

SUMMARY OF INVENTION

It is an object of the invention to provide an improved method for displaying the output of a radiation-sensitive detector.

The invention contemplates that the image intensity will never be over-modulated to black or white without some room being left over for displaying small superposed details in the image, which are reproduced by the high frequency parts of the video signal.

The selected low and high signal levels which are to be paired together with the maximum and minimum output signal of the radiation detector are determined by statistic parameters for the signal values. The distribution curve of the signals are calculated continuously and from it there is selected percentiles, e.g., the 10 percentile and 90 percentile, and the amplification is adjusted such that these correspond to predetermined image intensities. Other points in the distribution curve may also be utilized for adjusting the image intensity. With the method selected, the change in image intensity will be proportional to the change in the output signal of the radiation detector.

When the image contrast in respect of details has been improved according to the above, only noise in the detector output signal should limit enabling the discovery of small weakly contrasting details with the aid of the image.

The method can be extended so that more than two statistic parameters, inter alia medium value, mean value, variance, percentile values, are selected to correspond to certain image intensities, although the relationship between image intensity and the signal it represents will then no longer be proportional.

BRIEF DESCRIPTION OF DRAWINGS

An embodiment of a method in accordance with the invention is next described with reference in to the appended drawings, in which.

DETAILED DESCRIPTION OF THE PREFERRED EMBODIMENT OF THE INVENTION

In one example of a method in accordance with the invention it is assumed that the video signals from a scanning IR detector are to be shown on a television monitor. The IR radiation detected by the detector is conventionally converted to video signals. In the present example, the video signals are further converted to digital form, all subsequent filtering and other signal processing being carried out digitally. The processed signals are converted to analogue form before display.

Signal processing is started by low-pass filtering; in the following, processing is only carried out on the low-frequency components of the video signal, the high-frequency components being excepted from the signal processing.

The signals corresponding to image elements in the image are treated statistically to ascertain what signal value corresponds to a selected statistic parameter for signals, e.g., the 10 percentile. The calculation is carried out simply, such that for an assumed value of the signal representing the 10 percentile it is checked that 10% of the signal values come under the limit, also called threshold, and the rest of the values are above the threshold. The level of the signals generating the image is then adjusted such that the assumed signal value gives rise to an image intensity suitably far enough away from the minimum of the image intensity $I_{min}$ for high-frequency signals coming from small details in the image to find room in the signals without falling below $I_{min}$.

Should the assumed limiting value representing the 10 percentile result in that an incorrect number of signal values fall below or above the value, the assumed threshold value is successively adjusted for each new image which is tested, until the right number of measured values fall on either side of the set threshold. A number of new signal values are introduced into the calculation for each new image which is tested, and the same number are cancelled from the calculation. In this mode there is obtained an adaptive setting of the correspondence between percentile for the signal and its associated image intensity.

In the same way as has been described for setting the 10 percentile, the 90 percentile, for example, may also be set against an image intensity which is sufficiently far away from the maximum image intensity $I_{max}$ so that high-frequency signals coming from small details in the image will have room in the signal without coming above $I_{max}$.

Figure 1:
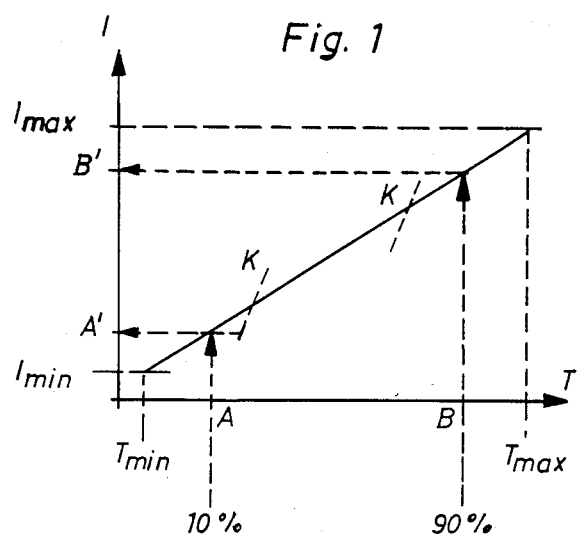
FIG. 1 illustrates the relationship between signal value and image intensity in a first case.

The adjustments described here are illustrated in FIG. 1, which shows the relationship between signal T and image intensity I. On one occasion, the measured signal values lie between $T_{min}$ and $T_{max}$; the 10 percentile is at A and the 90 percentile at B. An image intensity A' corresponds to the 10 percentile at A, and an intensity B' corresponds to the 90 percentile at B. A straight line is drawn between the points on the diagram determined in this way, its slope representing an amplification applying in this case to the low-frequency components of the image signal.

It will be seen that if, for another occasion, the difference in the signal values between the percentiles A and B is another, while the image intensities A' and B' are unchanged, the amplification, illustrated by a line having a different slope in the diagram, is given a different value. This illustrates the adaptive regulation of the amplification.

Both the dashed oblique lines K in the diagram illustrate the relationship between the signal value T and image intensity I for high-frequency components in the video signal. The amplification for these for all signal values is the same, and for the normal case higher than for the low-frequency components.

Figure 2:
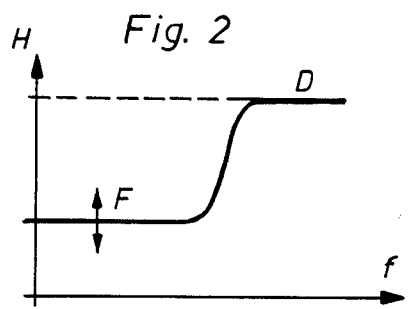
FIG. 2 illustrates the relationship between image signal frequency and amplification in the first case.

The method of regulation is also illustrated with the aid of the diagram in FIG. 2, which illustrates the relationship between the video signal frequency f and its amplification H. At section D, the curve drawn with a full line shows that the amplification H for the high-frequency components in the image signal is unvaryingly high. Section F of the curve shows that the amplification H varies for low-frequency components in the video signal and is adjusted to the signal content of the image, it being lower than for high-frequency components in normal cases.

Figure 4:
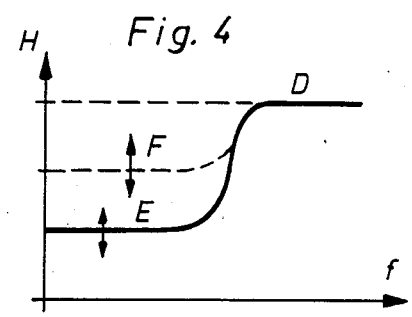
FIG. 4 illustrates the relationship between image signal frequency and amplification in the second case.
Figure 3:
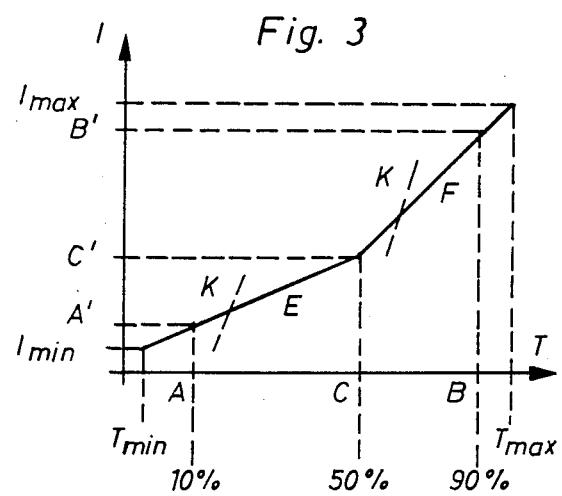
FIG. 3 illustrates the relationship between signal value and image intensity in a second case.

In an alternative to the described method, image intensities are determined which correspond to more than two points in the distribution curve for the low-frequency components from the video signal. In FIG. 3 it is shown how an image intensity A' corresponds to the 10 percentile A, an intensity B' corresponds to the 90 percentile B, and an intensity C' corresponds to the 50 percentile C. The straight curve sections illustrating how the three points given in the diagram define two different amplifications E and F. The relationship between the video signal frequency f and amplification H is illustrated in FIG. 4. As in the previously described case, the curve section D is such that the amplification for high-frequency components in the video signal is high and unvarying, while for low-frequency components it is lower and varying and has two separate values, the curve sections E and F.

The advantage of defining three points in this way in the relationship between signal value and image intensity, and thereby two different amplifications for low-frequency components in the video signal, is that it enables placing a value, e.g., the median value, in the measured signals at a selected, suitable image intensity. It is often suitable to allow the median value to the signals to correspond to the image intensity of 30%. This example is described with reference to FIG. 3.

The number of points which are used to define the amplification from signal value to image intensity is optional, but the more points which are selected the less will be the use of a new, added point and the more the effort of calculating the points increases. It will probably not be regarded as suitable to calculate more than three points.

Figure 5:
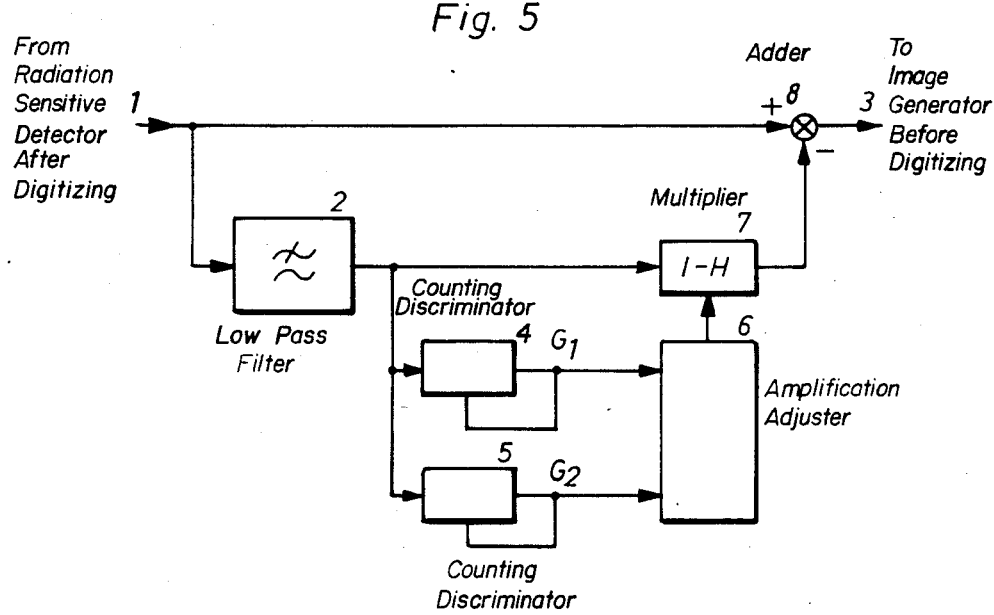
FIG. 5 is a block diagram of the apparatus for carrying out the method of the invention.

For putting the described method into execution there are required, further to a conventional radiation-sensitive detector and conventional means for image generation, special circuits which are shown in FIG. 5. Video signals are fed via an input 1 to the apparatus. Low-frequency parts of the signals are transferred through a low-pass filter 2, high-frequency parts being transferred directly to the output 3 of the circuits.

For a set limiting value $G_1$ a counting discriminator 4 counts that the right number of measuring values associated with an image come over or under the limiting value. If the counting result is not the one intended, the limiting value $G_1$ is adjusted. The limiting value referred to here can correspond to the 10 percentile already mentioned.

In a second counting discriminator 5 the measured values are checked against a second limiting value $G_2$, which can be the 90 percentile.

The limiting values $G_1$ and $G_2$, which are set for the moment, are evaluated in an amplification adjuster 6 for setting an amplification H corresponding to these values. A multiplier 7 multiplies the low-frequency signals coming from the filter 2 by (1-H). The multiplied signals are subtracted in an adder 8 from the incoming ones containing the sum of the low-frequency and high-frequency signals, the high-frequency signals together with the low-frequency signals amplified by the factor H being transmitted to the output 3.

The described method can alternatively be put into execution with an apparatus where, instead of the low-frequency parts of the signal spectrum being filtered out, the high-frequency parts of the spectrum are filtered out. The limits $G_1$ and $G_2$ are in this case calculated starting from the unfiltered input signal. The unfiltered signal is multiplied by the previously mentioned amplification H, and subsequent thereto the filtered-out high-frequency part of the signal multiplied by (1-H) is added.

What is claimed is:

1. In displaying on a viewing screen a varying image generated by video signals converted from output signals from a radiation detector, the method of enhancing the contrast of weakly contrasting details in the image when the radiation picked up by the detector covers a large intensity range comprising the steps of periodically measuring values of the output signals, statistically calculating two statistical parameter characteristics of the statistical properties of the thusly measured values, and adaptively regulating the amplification of video signals in parts of the video frequency spectrum which are below a given frequency value as a function the two statistically calculated statistical parameters.

2. The method of claim 1 wherein said regulating includes setting upper and lower amplification limiting values in accordance with said two statistical parameters.

3. The method of claim 2 wherein said measuring step comprises converting the output signals to sets of digital values.

4. The method of claim 3 wherein said statistically calculating step comprises determining the upper and lower percentile value for said sets of digital values and changing said amplification limiting values when the statistical distribution in a set of digital values changes.

5. In displaying on a view screen a varying image generated by video signals converted from output digital values derived by processing input digital values converted from signals emitted by a radiation detector, the method of processing said input digital values to said output signal values so that the contrast is enhanced for weakly contrasting details in the image when the radiation picked up by the radiation detector covers a large intensity range comprising:

(a) low pass filtering the input digital values;
(b) counting the number of filtered input digital values on either side of a limit corresponding to a selected point in the distribution curve of filtered input digital values;
(c) adjusting the limit until the number of filtered input digital values falling on either side thereof correspond to said selected point;
(d) repeating the counting and adjusting for a second limit corresponding to a second selected point in said distribution curve; and
(e) adjusting the magnitude of said filtered input digital values to form at least part of said output digital values.

6. The method of claim 4 further comprises subtracting the magnitude adjusted filtered input digital values from said input digital values to form said output digital values.

* * * * *